(12) United States Patent
Hayashida et al.

(10) Patent No.: US 10,011,701 B2
(45) Date of Patent: Jul. 3, 2018

(54) FLUOROSILICONE RUBBER COMPOSITION

(71) Applicant: Shin-Etsu Chemical Co., Ltd., Chiyoda-ku (JP)

(72) Inventors: Osamu Hayashida, Annaka (JP); Kazuhiro Oishi, Annaka (JP); Atsuhito Kashima, Annaka (JP)

(73) Assignee: Shin-Etsu Chemical Co., Ltd., Chiyoda-ku (JP)

( * ) Notice: Subject to any disclaimer, the term of this patent is extended or adjusted under 35 U.S.C. 154(b) by 613 days.

(21) Appl. No.: 14/557,594

(22) Filed: Dec. 2, 2014

(65) Prior Publication Data

US 2015/0166765 A1  Jun. 18, 2015

(30) Foreign Application Priority Data

Dec. 16, 2013 (JP) ................................. 2013-259015

(51) Int. Cl.
*C08K 3/36* (2006.01)
*C08K 5/14* (2006.01)

(52) U.S. Cl.
CPC .................. *C08K 3/36* (2013.01); *C08K 5/14* (2013.01); *C08K 2201/006* (2013.01)

(58) Field of Classification Search
CPC ............ C08G 77/24; C08L 83/08; C08K 3/36
USPC ........................................................ 524/493
See application file for complete search history.

(56) References Cited

U.S. PATENT DOCUMENTS

| | | | |
|---|---|---|---|
| 5,569,698 A | | 10/1996 | Maxson |
| 6,369,155 B1 | * | 4/2002 | Takita ..................... C08L 83/08 |
| | | | 277/910 |
| 2004/0235994 A1 | | 11/2004 | Okamoto et al. |
| 2007/0072990 A1 | | 3/2007 | Okamoto et al. |
| 2008/0045649 A1 | | 2/2008 | Okamoto et al. |
| 2008/0305294 A1 | | 12/2008 | Okamoto et al. |
| 2009/0176930 A1 | | 7/2009 | Okamoto et al. |

FOREIGN PATENT DOCUMENTS

| | | | |
|---|---|---|---|
| EP | 0667373 | * | 2/1995 |
| EP | 0 773 251 A2 | | 5/1997 |
| JP | 2010-155961 A | | 7/2010 |
| JP | 5338380 | * | 11/2013 |

OTHER PUBLICATIONS

Extended European Search Report dated May 7, 2015 in Patent Application No. 14196011.2.

* cited by examiner

*Primary Examiner* — Deve E Valdez
(74) *Attorney, Agent, or Firm* — Oblon, McClelland, Maier & Neustadt, L.L.P.

(57) ABSTRACT

A fluorosilicone rubber composition is provided comprising (A) a fluorosilicone gum having an aliphatic unsaturated monovalent hydrocarbon group content of 0.03-1 mol % based on the total of monovalent hydrocarbon groups and a residual alkali metal content of up to 20 ppm, (B) reinforcing silica having a specific surface area of 50-100 $m^2/g$, and (C) an organic peroxide catalyst. The composition is molded into silicone rubber parts which are improved in compression set even after immersion in ε-caprolactam.

12 Claims, No Drawings

FLUOROSILICONE RUBBER COMPOSITION

CROSS-REFERENCE TO RELATED APPLICATION

This non-provisional application claims priority under 35 U.S.C. § 119(a) on Patent Application No. 2013-259015 filed in Japan on Dec. 16, 2013, the entire contents of which are hereby incorporated by reference.

TECHNICAL FIELD

This invention relates to fluorosilicone rubber compositions which are molded into silicone rubber parts which are improved in compression set even after swell in epsilon-caprolactam.

BACKGROUND ART

Silicone rubber compositions are used in a wide variety of fields by virtue of their advantages including ease of working, ease of molding, and excellent molded properties such as heat resistance, freeze resistance, weather resistance and electrical insulation. In particular, compositions based on fluorosilicone rubber having 3,3,3-trifluoropropyl groups as side chain have solvent resistance as well and find use as diaphragms, O-rings, oil seals and other parts in transportation equipment and petroleum-related equipment.

As opposed to dimethylsilicone, fluorosilicone is known susceptible to oxidative degradation and siloxane decomposition under the action of heat, acid and alkali. Presumably, such phenomena are caused by ease of polarization attributable to trifluoropropyl groups and hydrogen fluoride generated upon oxidation. As a result, when the fluorosilicone is used in contact with a non-silicone resin, its physical properties can be substantially impaired by migrants from the adjacent resin. For example, when the fluorosilicone is used in contact with nylon 6, it will be swollen in the reactant (i.e., raw material), ε-caprolactam. After swell, compression set is substantially exacerbated as compared with the unaffected state. This is because ε-caprolactam which is a polar substance serves to enhance the activity of trace alkali components (originating from additives and neutralization salt of polymerization catalyst), inducing scission of fluorosilicone rubber main chain.

Under the circumstances, fluorosilicone rubber compositions which are improved in compression set are proposed as disclosed in Patent Documents 1 to 3. Despite these proposals, the compression set after swell in ε-caprolactam is still unsatisfactory.

CITATION LIST

Patent Document 1: JP-A H05-186699
Patent Document 2: JP-A H14-179917
Patent Document 3: JP 3705345 (U.S. Pat. No. 6,610,778)

DISCLOSURE OF INVENTION

An object of the invention is to provide a fluorosilicone rubber composition which is molded and cured into a silicone rubber part which is improved in compression set even after swell in ε-caprolactam, reactant for nylon 6.

The inventors have found that when a fluorosilicone polymer having a content of aliphatic unsaturated monovalent hydrocarbon group (typically alkenyl) of 0.03 to 1 mol % and an alkali metal content of up to 20 ppm and a reinforcing filler having a BET specific surface area of 50 to 100 m$^2$/g are used, the compression set is dramatically improved over the prior art compositions even after swell in ε-caprolactam.

As used herein, the fluorosilicone rubber refers to a silicone rubber based on a base polymer of unique molecular structure, that is, a linear diorganopolysiloxane in which the majority (specifically at least 90 mol %, more specifically at least 95 mol %) of diorganosiloxane units of which the main chain is composed consist of (3,3,3-trifluoropropyl)methylsiloxane units, about 50 mol % of entire substituted or unsubstituted monovalent hydrocarbon groups bonded to silicon atoms are 3,3,3-trifluoropropyl groups, and a number of 3,3,3-trifluoropropyl groups are contained in the molecule which number is substantially equal to the number of silicon atoms in the molecule. In the sense that the fluorosilicone rubber is based on a base polymer of unique molecular structure, the fluorosilicone rubber is essentially different in chemical, physical and morphological properties from customary silicone rubbers based on dimethylpolysiloxane or similar base polymer.

Accordingly, the invention provides a fluorosilicone rubber composition comprising
(A) 100 parts by weight of a fluorosilicone gum having an aliphatic unsaturated monovalent hydrocarbon group content of 0.03 to 1 mol % based on the total of substituted or unsubstituted monovalent hydrocarbon groups bonded to silicon atoms and a residual alkali metal content of up to 20 ppm,
(B) 5 to 80 parts by weight of reinforcing silica having a BET specific surface area of 50 to 100 m$^2$/g, and
(C) a catalytic amount of an organic peroxide catalyst.

Preferably, component (A) is an organopolysiloxane of the general formula (1) having a viscosity of at least 10,000 mPa·s at 25° C.

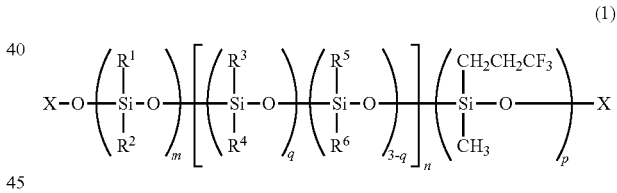

(1)

Herein each of R$^1$ to R$^5$ is a substituted or unsubstituted, aliphatic saturated monovalent hydrocarbon group of 1 to 8 carbon atoms or aromatic monovalent hydrocarbon group, R$^6$ is a substituted or unsubstituted, aliphatic unsaturated monovalent hydrocarbon group of 2 to 10 carbon atoms, X is hydrogen or a silyl group of the general formula (2) or (3):

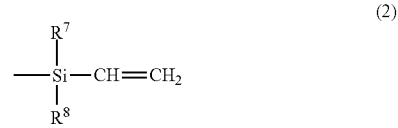

(2)

(3)

wherein each of R$^7$ to R$^{11}$ is a monovalent hydrocarbon group of 1 to 8 carbon atoms exclusive of aliphatic unsaturated group, m is an integer of 0 to 30, n is an integer of 1 to 100, p is an integer of at least 500, and q is 0 or 2, with the proviso that unit (B) of the formula:

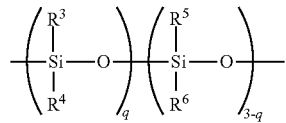

and unit (C) of the formula:

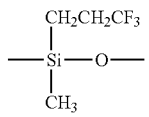

are randomly arranged, and unit (B) consists of three siloxane subunits including subunit —SiR$^3$R$^4$O— and subunit —SiR$^5$R$^6$O— wherein the three siloxane subunits are randomly arranged as long as the number of subunit —SiR$^3$R$^4$O— is q=0 or 2 and the number of subunit —SiR$^5$R$^6$O— is 3-q.

The fluorosilicone rubber composition may further comprise (D) a platinum compound in an amount to give 1 to 2,000 ppm of platinum based on the total weight of the composition.

Advantageous Effects of Invention

The fluorosilicone rubber composition is molded into a silicone rubber part which is improved in compression set even after swell in ε-caprolactam, reactant for nylon 6.

DESCRIPTION OF PREFERRED EMBODIMENTS

Components of the fluorosilicone rubber composition are described below. Component (A) is a fluorosilicone gum, that is, trifluoropropyl(methyl)polysiloxane having a high degree of polymerization, which serves as a base polymer in the rubber composition. Typically it is a linear diorganopolysiloxane having the general formula (1) below. As used herein, the term "gum" refers to a high polymer in the form of an extremely viscous liquid having a viscosity at room temperature (25° C.) of at least 10,000 mPa·s, more specifically at least 100,000 mPa·s, and even more specifically at least 1,000,000 mPa·s, or a non-self-flowing non-liquid (paste or solid). It is noted that the viscosity is measured by a rotational viscometer, for example, BL, BH, BS or cone-plate type viscometer.

(1)

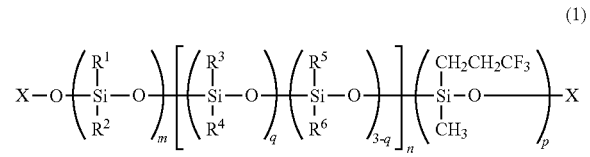

Herein each of R$^1$ to R$^5$ is a substituted or unsubstituted, aliphatic saturated monovalent hydrocarbon group of 1 to 8 carbon atoms or aromatic monovalent hydrocarbon group, R$^6$ is a substituted or unsubstituted, aliphatic unsaturated monovalent hydrocarbon group of 2 to 10 carbon atoms, X is hydrogen or a silyl group of the general formula (2) or (3):

(2)

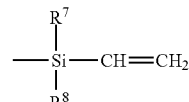

(3)

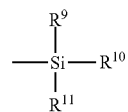

wherein each of R$^7$ to R$^{11}$ is a monovalent hydrocarbon group of 1 to 8 carbon atoms exclusive of aliphatic unsaturated group, m is an integer of 0 to 30, n is an integer of 1 to 100, p is an integer of at least 500, and q is 0 or 2, which means that the total number of R$^3$R$^4$SiO and R$^5$R$^6$SiO subunits in unit (B) is 3. In the molecule, unit (B) of the formula:

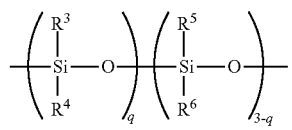

and unit (C) of the formula:

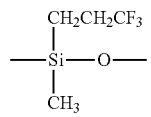

are randomly arranged. Unit (B) consists of three siloxane subunits including subunit —SiR$^3$R$^4$O— and subunit —SiR$^5$R$^6$O— wherein the three siloxane subunits are randomly arranged as long as the number of subunit —SiR$^3$R$^4$O— is q=0 or 2 and the number of subunit —SiR$^5$R$^6$O— is (3-q)=3 or 1.

In formula (1), R$^1$ to R$^5$ are each independently selected from substituted or unsubstituted, aliphatic saturated, monovalent hydrocarbon groups of 1 to 8 carbon atoms and aromatic monovalent hydrocarbon groups. Examples include alkyl groups such as methyl, ethyl, propyl, isopropyl, butyl, isobutyl, tert-butyl, pentyl, hexyl, cyclohexyl, heptyl and octyl, aryl groups such as phenyl and tolyl, aralkyl groups such as benzyl, and substituted forms of the foregoing in which some or all carbon-bonded hydrogen atoms are substituted by halogen atoms, cyano radicals or the like, such as chloromethyl, chloropropyl, 3,3,3-trifluoropropyl, and 2-cyanoethyl. Of these, R$^1$ and R$^2$ are preferably methyl, and R$^3$, R$^4$ and R$^5$ are preferably methyl or 3,3,3-trifluoropropyl. R$^6$ is a substituted or unsubstituted, aliphatic unsaturated, monovalent hydrocarbon group of 2 to 10 carbon atoms, preferably 2 to 8 carbon atoms, more preferably 2 to 4 carbon atoms, typically alkenyl group such as vinyl, allyl, propenyl, isopropenyl, butenyl, isobutenyl, pentenyl, hexenyl, cyclohexenyl, heptenyl, octenyl or nonanyl. Inter alia, vinyl is preferred.

R$^7$ to R$^{11}$ are each independently selected from monovalent hydrocarbon groups of 1 to 8 carbon atoms free of aliphatic unsaturation, typically aliphatic saturated monovalent hydrocarbon groups of 1 to 8 carbon atoms, preferably 1 to 6 carbon atoms and aromatic monovalent hydrocarbon groups, examples of which include alkyl groups such as methyl, ethyl, propyl and butyl, aryl groups such as phenyl and tolyl, and substituted forms of the foregoing in which some or all carbon-bonded hydrogen atoms are substituted by halogen atoms, cyano radicals or the like, such as chloromethyl, chloropropyl, 3,3,3-trifluoropropyl, and 2-cyanoethyl.

X is hydrogen, a silyl group of formula (2) or a silyl group of formula (3), which means that the polysiloxane is capped at the molecular chain end with a silanol or triorganoxy group. The subscript m is an integer of 0 to 30, preferably 0 to 12, and more preferably 3 to 8; n is an integer of 1 to 100, preferably 2 to 50, and more preferably 3 to 20; p is an integer of at least 500, preferably 500 to 10,000, more preferably 1,000 to 9,000, and even more preferably 2,000 to 8,000; m+n+p is an integer of preferably 1,000 to 10,000, more preferably 2,000 to 9,000; and g is 0 or 2.

In component (A), at least two aliphatic unsaturated monovalent hydrocarbon groups (typically alkenyl groups) are contained. The content of aliphatic unsaturated monovalent hydrocarbon groups should be in the range of 0.03 to 1 mol % based on the total of substituted or unsubstituted monovalent hydrocarbon groups bonded to silicon atoms. It is preferred from the standpoint of resistance to compression set (especially resistance to compression set after swell in ε-caprolactam) that the content of aliphatic unsaturated monovalent hydrocarbon groups be in the range of 0.05 to 0.5 mol %, more preferably 0.1 to 0.3 mol %.

It is noted that the degree of polymerization (DOP) or molecular weight is a weight average degree of polymerization or molecular weight as determined versus polystyrene standards by gel permeation chromatography (GPC) using toluene or tetrahydrofuran as developing solvent.

The organopolysiloxane of formula (1) may be prepared by the polymerization method of JP 5338380, except that an aliphatic unsaturated group-providing source is selected depending on the value of q in formula (1) and a catalyst is selected depending on the terminal configuration (or type of endcapping group).

Specifically, an organopolysiloxane of formula (1) wherein q=0 may be obtained from ring-opening polymerization of a mixture of tris(3,3,3-trifluoropropyl)trimethyl-cyclo-trisiloxane, i.e., a cyclic trimer of the following formula (4) and a cyclotrisiloxane of the following formula (5) as the aliphatic unsaturated group-providing source in the presence of an alkali metal catalyst. An organopolysiloxane of formula (1) wherein q=2 may be obtained similarly aside from using a cyclotrisiloxane of the following formula (6) as the aliphatic unsaturated group-providing source (e.g. vinyl-providing source).

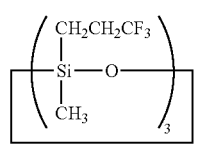

(4)

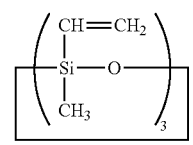

(5)

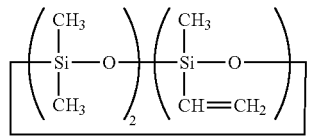

(6)

Of the organopolysiloxanes of formula (1), those wherein at least one X is a silyl group of formula (2) or (3) may be obtained by effecting living (co)polymerization of the aforementioned cyclic trisiloxane in the presence of a polymerization accelerator to synthesize polyfluoroalkylmethylsiloxane, and neutralizing the product with a weak acid such as acetic acid for terminal inactivation. The polymerization accelerator used herein is an alkyl lithium catalyst such as butyl lithium or a siloxane oligomer of organolithium compound having the following formula (7), i.e., a monofunctional lithium silanolate catalyst capped with a lithium ion at one end of its molecular chain (see JP-A S62-174260).

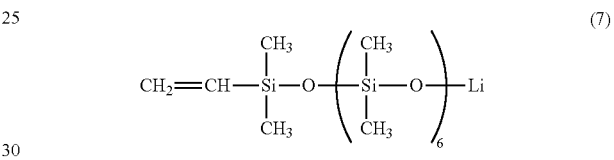

(7)

Alternatively, the intermediate, polyfluoroalkylmethylsiloxane may be capped at its end with a silylating agent having a group of formula (2) and/or (3). The silylating agent having a group of formula (2) or (3) used herein is not particularly limited and may be selected from well-known agents. Exemplary of the silylating agent are organochlorosilanes, organodisilazanes and organodisiloxanes including trimethylchlorosilane, hexamethyldisilazane, hexamethyldisiloxane, dimethylvinylchlorosilane, 1,3-divinyltetramethyldisilazane, 1,3-divinyltetramethyldisiloxane, divinylmethylchlorosilane, 1,3-dimethyltetravinyldisilazane, 1,3-dimethyltetramethyldisiloxane, trivinylchlorosilane, hexavinyldisilazane, and hexamethyldisiloxane.

The silylating method and reaction conditions may in accord with well-known silylating methods and reaction conditions. Specifically, a silylating agent selected from among chlorosilanes, disilazanes and disiloxanes as mentioned above, is added to the polyfluoroalkylmethylsiloxane in an amount of 1 to 50 moles, preferably 1 to 20 moles per mole of silanol group (i.e., silicon-bonded hydroxyl group) at the polymer end, whereupon reaction is conducted at room temperature or elevated temperature (e.g., 60 to 150° C., preferably 80 to 120° C.) for silylating the terminal silanol group.

When component (A) is an organopolysiloxane of formula (1) wherein two X's at opposite ends of the molecular chain are both hydrogen and m=0, copolymerization may be carried out in the presence of an alkali metal polymerization catalyst which is, for example, a difunctional lithium silanolate catalyst capped with lithium ions at both ends of the backbone or molecular chain consisting of recurring diorganosiloxane units, represented by the formula (8):

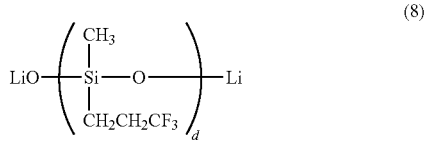

(8)

wherein d is an integer in the range: 0<d≤100, or a mixture of an organopolysiloxane capped with silanol groups (i.e., silicon-bonded hydroxyl groups) at both ends of its molecular chain, represented by the formula (9):

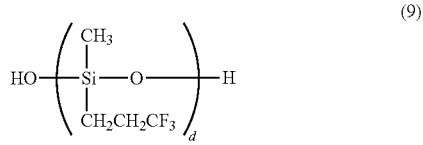

(9)

wherein d is an integer in the range: 0<d≤100, and an alkyl lithium catalyst or (monofunctional) lithium silanolate catalyst.

The fluorosilicone gum contains an alkali metal such as Li or Na (inclusive of a metal ion in salt form) originating from the catalyst used during the preparation of component (A). Finally, the content of alkali metal should be up to 20 ppm (0 to 20 ppm), especially up to 15 ppm (e.g., 0.1 to 15 ppm) based on the total weight of component (A). An alkali metal content in excess of 20 ppm invites an outstanding deterioration of compression set because scission of siloxane main chain by the attack of alkali metal is promoted upon swelling in ε-caprolactam. The content of alkali metal or its salt may be controlled by adjusting the addition amount during polymerization or by removing the alkali metal via the step of purifying the polymerized product, for example, water washing. When component (A) is an organopolysiloxane of formula (1) wherein X's at opposite ends of the molecular chain are both hydrogen (i.e., capped with silanol groups at both ends of the molecular chain), the content of alkali metal in component (A) is more preferably up to 10 ppm (0 to 10 ppm). As component (A), the organopolysiloxane may be used alone or in admixture of two or more.

Component (B) is a reinforcing silica filler, which is essential to formulate a silicone rubber compound having improved mechanical strength. It is known that the silica filler contributes to an improvement in mechanical strength, but a deterioration in resistance to compression set. To avoid such deterioration, the silica filler should have a specific surface area of 50 to 100 m²/g, preferably 50 to 90 m²/g, as measured by the BET method. A filler with a surface area in excess of 100 m²/g is effective for improvement in mechanical strength, but causes a deterioration in resistance to compression set. A filler with a surface area of less than 50 m²/g causes a material loss of mechanical strength. Examples of the silica filler include fumed silica (dry silica), fired silica, and precipitated silica (wet silica). The silica filler may be surface treated with an organopolysiloxane, organopolysilazane, chlorosilane or alkoxysilane for rendering the surface hydrophobic. The silica filler may be used alone or in admixture of two or more. The silica filler is added in an amount of 2 to 100 parts by weight, preferably 5 to 60 parts by weight per 100 parts by weight of the organopolysiloxane as component (A). Less than 2 pbw of the silica filler is too small to attain the desired reinforcing effect whereas more than 100 pbw of the silica filler interferes with working, and physical properties of the resulting silicone rubber become poor.

Component (C) is an organic peroxide catalyst or cure catalyst. The fluorosilicone rubber composition having the cure catalyst added thereto can be vulcanized and cured into a cured part by any standard technique. For vulcanization and cure, any of well-known organic peroxides may be used. Examples of the peroxide include benzoyl peroxide, tert-butyl perbenzoate, o-methylbenzoyl peroxide, p-methylbenzoyl peroxide, di-tert-butyl peroxide, dicumyl peroxide, 1,1-bis(tert-butylperoxy)-3,3,5-trimethylcyclohexane, 2,5-dimethyl-2,5-di(tert-butylperoxy)hexane, and 2,5-dimethyl-2,5-di(tert-butylperoxy)hexyne, alone or in admixture of two or more. The cure catalyst is used in a catalytic amount to induce cure. Typically, 0.1 to 5 parts by weight of the organic peroxide is used per 100 parts by weight of the fluorosilicone rubber composition.

In addition to the organic peroxide catalyst (C), an addition cure agent may be used, if desired, which is a combination of a platinum base catalyst with an organohydrogenpolysiloxane having at least two silicon-bonded hydrogen atoms (SiH groups). As a preferred combination, the platinum base catalyst is used in an amount to provide 1 to 2,000 ppm, more preferably 5 to 200 ppm of platinum based on the weight of the organopolysiloxane (A), and the organohydrogenpolysiloxane is used in such an amount as to provide 0.5 to 5 SiH groups per aliphatic unsaturated hydrocarbon group in the organopolysiloxane (A).

Component (D) is a platinum compound which is optional. When the fluorosilicone rubber is applied to a substrate of nylon resin containing ε-caprolactam, the platinum compound, if added, is effective for preventing the fluorosilicone rubber from deteriorating its resistance to compression set. This is probably because platinum atom captures ε-caprolactam. In the embodiment wherein the addition cure agent is used along with the organic peroxide catalyst (C), the total amount of platinum must be carefully controlled because platinum is available from both the platinum compound and the platinum catalyst in the addition cure agent. Specifically, in the embodiment wherein the addition cure agent is omitted (i.e., the composition is free from organohydrogenpolysiloxane), the platinum compound as component (D) is preferably used in such an amount as to provide about 1 to 100 ppm, more preferably about 5 to 50 ppm of platinum based on the total weight of the composition. In the other embodiment wherein the addition cure agent is used (i.e., the composition contains organohydrogenpolysiloxane), the platinum catalyst (in the addition cure agent) and the platinum compound as component (D) are preferably used in such a total amount as to provide about 1 to 2,000 ppm, more preferably about 5 to 500 ppm of platinum based on the total weight of the composition. The platinum compound used as component (D) is similar to the platinum catalyst in the addition cure agent and selected from alcohol-modified chloroplatinic acid, chloroplatinic acid-olefin complexes, and chloroplatinic acid-divinyltetramethylsiloxane complexes, for example.

Besides the foregoing components, additives may be optionally added to the fluorosilicone rubber composition as long as the benefits of the invention are not impaired. Suitable additives are well-known additives commonly used in silicone rubber compositions, including heat resistance improvers, antioxidants, colorants, and parting agents, such as cerium compounds and iron oxide.

The fluorosilicone rubber composition which is molded into fluorosilicone rubber parts is of millable type in that components can be uniformly milled under shear stress conditions on a kneader or mill such as a two-roll mill. The composition is obtainable by mixing the components on a rubber mill such as a two-roll mill, Banbury mixer or dough mixer (kneader) until uniform.

The fluorosilicone rubber composition may be molded into the desired shape by any of standard rubber molding methods including compression molding, transfer molding, injection molding, extrusion molding, and calendering. Typical molded rubber parts include O-rings, diaphragms, packings, and gaskets. If desired, molding may be followed by secondary vulcanization at 180 to 250° C. for 1 to 10 hours.

EXAMPLE

Examples of the invention are given below by way of illustration and not by way of limitation. All parts are by weight. DOP is a weight average degree of polymerization as determined versus polystyrene standards by GPC using toluene as developing solvent.

Examples 1, 2 and Comparative Examples 1, 2

A fluorosilicone base compound was prepared by adding 40 parts of dry silica and 10 parts of diphenylsilane diol as a dispersant to 100 parts of a fluorosilicone gum having a Li content of 15 ppm and a vinyl content of 0.15 mol %, represented by the formula (10) below, uniformly mixing them, heat treating the blend at 150° C. for 4 hours, and milling the blend on a twin-roll mill for plasticization. The dry silica was Aerosil 50, Aerosil 90 or Aerosil 130 commercially available from Nippon Aerosil Co., Ltd., as shown in Table 1. The resulting base compounds are designated Base Compounds A, B and C.

For comparison sake, a fluorosilicone base compound was prepared by the same procedure as in Example 1 aside from using a fluorosilicone gum (10a) having a Na content of 25 ppm and a vinyl content of 0.15 mol %, represented by the formula (10) below. This is designated Base Compound D.

To 100 parts of the base compound were added 1 part of cerium oxide powder having an average particle size of 3 μm and a specific surface area of 130 m²/g and 0.8 part of a paste containing 80 wt % 2,5-dimethyl-2,5-di(tert-butylperoxy) hexane as a vulcanizer. On a two-roll mill, the ingredients were milled until uniform. There were obtained four (fully compounded) fluorosilicone rubber compositions corresponding to Examples 1, 2 and Comparative Examples 1, 2.

Measurement of Physical Properties

Physical properties (hardness, tensile strength, elongation at break, and compression set) were measured according to JIS K6249. Specifically, the composition was press molded and cured at 165° C. for 10 minutes and post-cured at 200° C. for 4 hours. In this way, sheet specimens of 2 mm thick were formed for hardness measurement, dumbbell specimens (prescribed in the JIS) were formed for the measurement of tensile strength and elongation at break, and disc specimens having a diameter of 13 mm and a thickness of 6.3 mm were formed for the measurement of compression set (% @150° C.×72 h). Another set of specimens were pretreated prior to the test. That is, specimens were immersed in a 20% ethanol solution of ε-caprolactam for 2 days and air dried for 1 day. The pretreated specimens were similarly tested. The results are shown in Table 2.

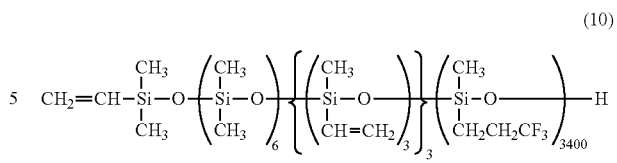

(10)

TABLE 1

| Composition (pbw) | Base Compound | | | |
|---|---|---|---|---|
| | A | B | C | D |
| Fluorosilicone gum (10) | 100 | 100 | 100 | |
| Fluorosilicone gum (10a) | | | | 100 |
| Aerosil 50 (50 m²/g) | 40 | | | 40 |
| Aerosil 90 (90 m²/g) | | 40 | | |
| Aerosil 130 (130 m²/g) | | | 40 | |
| Diphenylsilane diol | 10 | 10 | 10 | 10 |

* The value in parentheses is a BET specific surface area (m²/g).

TABLE 2

| Composition (pbw) | Example | | Comparative Example | |
|---|---|---|---|---|
| | 1 | 2 | 1 | 2 |
| Base Compound A | 100 | | | |
| Base Compound B | | 100 | | |
| Base Compound C | | | 100 | |
| Base Compound D | | | | 100 |
| Cerium oxide powder | 1 | 1 | 1 | 1 |
| Vulcanizer paste | 0.8 | 0.8 | 0.8 | 0.8 |
| Physical properties | | | | |
| Hardness (Durometer A) | 60 | 63 | 66 | 60 |
| Tensile strength (MPa) | 7.6 | 9.3 | 9.5 | 7.0 |
| Elongation at break (%) | 250 | 270 | 280 | 210 |
| Compression set (% @150° C. × 72 h) | 5 | 5 | 8 | 9 |
| Compression set (% @150° C. × 72 h) after immersion in ε-caprolactam solution | 24 | 26 | 41 | 32 |

Examples 3, 4 and Comparative Example 3

A fluorosilicone base compound was prepared by adding 40 parts of dry silica (Aerosil 50 by Nippon Aerosil Co., Ltd.) and 10 parts of diphenylsilane diol as a dispersant to 100 parts of a fluorosilicone gum having a Li content of 5 ppm and a vinyl content of 0.25 mol %, represented by the formula (11) below, uniformly mixing them, heat treating the blend at 150° C. for 4 hours, and milling the blend on a twin-roll mill for plasticization. This is designated Base Compound E. On a roll mill, 0.1 part of a chloroplatinic acid alcohol solution (2 wt % Pt) was added to Base Compound E, which was milled into Base Compound F.

For comparison sake, a fluorosilicone base compound was prepared by the same procedure as above aside from using a fluorosilicone gum having a Li content of 5 ppm and a vinyl content of 0.01 mol %, represented by the formula (12) below. This is designated Base Compound G.

To 100 parts of the base compound were added 1 part of cerium oxide powder having an average particle size of 3 μm and a specific surface area of 130 m²/g and 0.8 part of a paste containing 80 wt % 2,5-dimethyl-2,5-di(tert-butylperoxy) hexane as a vulcanizer. On a two-roll mill, the ingredients were milled until uniform. There were obtained three (fully compounded) fluorosilicone rubber compositions corresponding to Examples 3, 4 and Comparative Example 3.

As in Example 1, the compositions were molded and vulcanized before physical properties were measured. The results are shown in Table 4.

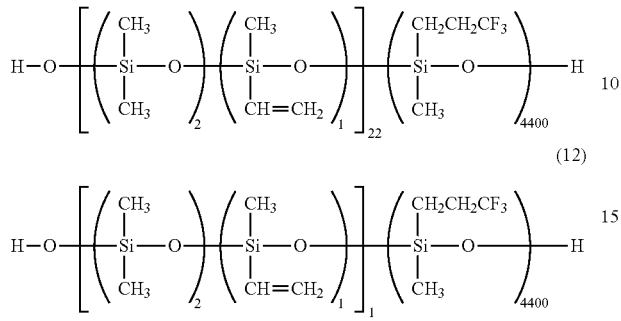

(11)

(12)

TABLE 3

| Composition (pbw) | Base Compound | | |
|---|---|---|---|
| | E | F | G |
| Fluorosilicone gum (11) | 100 | 100 | |
| Fluorosilicone gum (12) | | | 100 |
| Aerosil 50 (50 m²/g) | 40 | 40 | 40 |
| Diphenylsilane diol | 10 | 10 | 10 |
| Chloroplatinic acid in alcohol | | 0.1 | |

TABLE 4

| | Example | | Comparative Example |
|---|---|---|---|
| Composition (pbw) | 3 | 4 | 3 |
| Base Compound E | 100 | | |
| Base Compound F | | 100 | |
| Base Compound G | | | 100 |
| Cerium oxide powder | 1 | 1 | 1 |
| Vulcanizer paste | 0.8 | 0.8 | 0.8 |
| Physical properties | | | |
| Hardness (Durometer A) | 64 | 65 | 55 |
| Tensile strength (MPa) | 8.0 | 7.6 | 7.8 |
| Elongation at break (%) | 200 | 180 | 300 |
| Compression set (% @150° C. × 72 h) | 4 | 4 | 9 |
| Compression set (% @150° C. × 72 h) after immersion in ε-caprolactam solution | 16 | 14 | 42 |

Japanese Patent Application No. 2013-259015 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluorosilicone rubber composition comprising
   (A) 100 parts by weight of a fluorosilicone gum having an aliphatic unsaturated monovalent hydrocarbon group content of 0.03 to 1 mol % based on the total of substituted or unsubstituted monovalent hydrocarbon groups bonded to silicon atoms and a residual alkali metal content of 0.1 to 15 ppm,
   (B) 5 to 80 parts by weight of reinforcing silica having a BET specific surface area of 50 to 100 m²/g, and
   (C) a catalytic amount of an organic peroxide catalyst.

2. The fluorosilicone rubber composition of claim 1 wherein component (A) is an organopolysiloxane having the general formula (1):

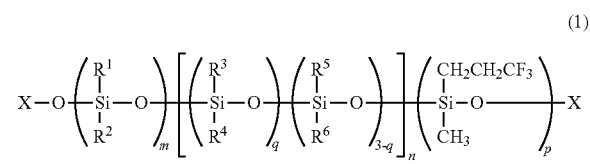

(1)

wherein each of $R^1$ to $R^5$ is a substituted or unsubstituted, aliphatic saturated monovalent hydrocarbon group of 1 to 8 carbon atoms or aromatic monovalent hydrocarbon group, $R^6$ is a substituted or unsubstituted, aliphatic unsaturated monovalent hydrocarbon group of 2 to 10 carbon atoms, X is hydrogen or a silyl group of the general formula (2) or (3):

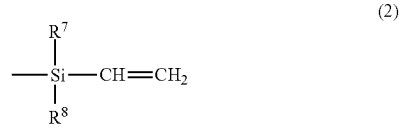

(2)

(3)

wherein each of $R^7$ to $R^{11}$ is a monovalent hydrocarbon group of 1 to 8 carbon atoms exclusive of aliphatic unsaturated group, m is an integer of 0 to 30, n is an integer of 1 to 100, p is an integer of at least 500, and q is 0 or 2, with the proviso that unit (B) of the formula:

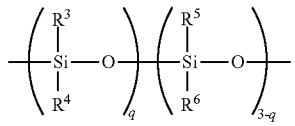

and unit (C) of the formula:

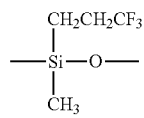

are randomly arranged, and unit (B) consists of three siloxane subunits including subunit —SiR³R⁴O— and subunit —SiR⁵R⁶O— wherein the three siloxane subunits are randomly arranged as long as the number of subunit —SiR³R⁴O— is q=0 or 2 and the number of subunit —SiR⁵R⁶O— is 3-q, said organopolysiloxane having a viscosity of at least 10,000 mPa·s at 25° C.

3. The fluorosilicone rubber composition of claim 1, further comprising (D) a platinum compound in an amount to give 1 to 2,000 ppm of platinum based on the total weight of the composition.

4. The fluorosilicone rubber composition of claim 1, wherein the BET specific surface area of the reinforcing silica is 50 to 90 m$^2$/g.

5. The fluorosilicone rubber composition of claim 1, wherein the fluorosilicone gum has a residual alkali metal content of 0.1 to 10 ppm.

6. The fluorosilicone rubber composition of claim 2, wherein in formula (1), X is hydrogen.

7. The fluorosilicone rubber composition of claim 2, wherein in formula (1), X is a silyl group of formula (2).

8. The fluorosilicone rubber composition of claim 2, wherein in formula (1), X is a silyl group of formula (3).

9. The fluorosilicone rubber composition of claim 2, wherein in formula (1), $R^1$ and $R^2$ are methyl.

10. The fluorosilicone rubber composition of claim 2, wherein in formula (1), $R^3$, $R^4$ and $R^5$ are each independently selected from the group consisting of methyl and 3,3,3-trifluoropropyl.

11. The fluorosilicone rubber composition of claim 2, wherein in formula (1), $R^6$ is selected from the group consisting of vinyl, allyl, propenyl, isopropenyl, butenyl, isobutenyl, pentenyl, hexenyl, cyclohexenyl, heptenyl, octenyl and nonenyl.

12. The fluorosilicone rubber composition of claim 2, wherein in formula (1), $R^6$ is vinyl.

\* \* \* \* \*